Nov. 15, 1932.                A. B. RYPINSKI                1,887,956
                            METER CONNECTION BOX
                    Filed Oct. 12, 1928        2 Sheets-Sheet 1
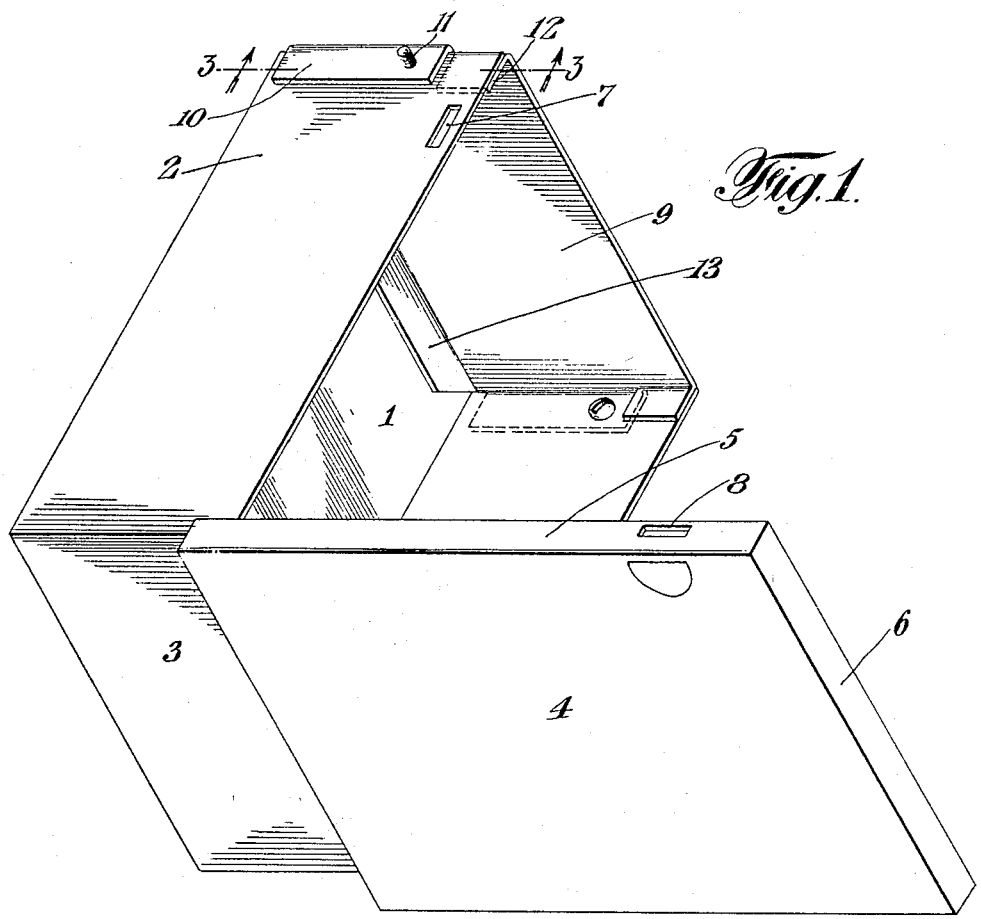
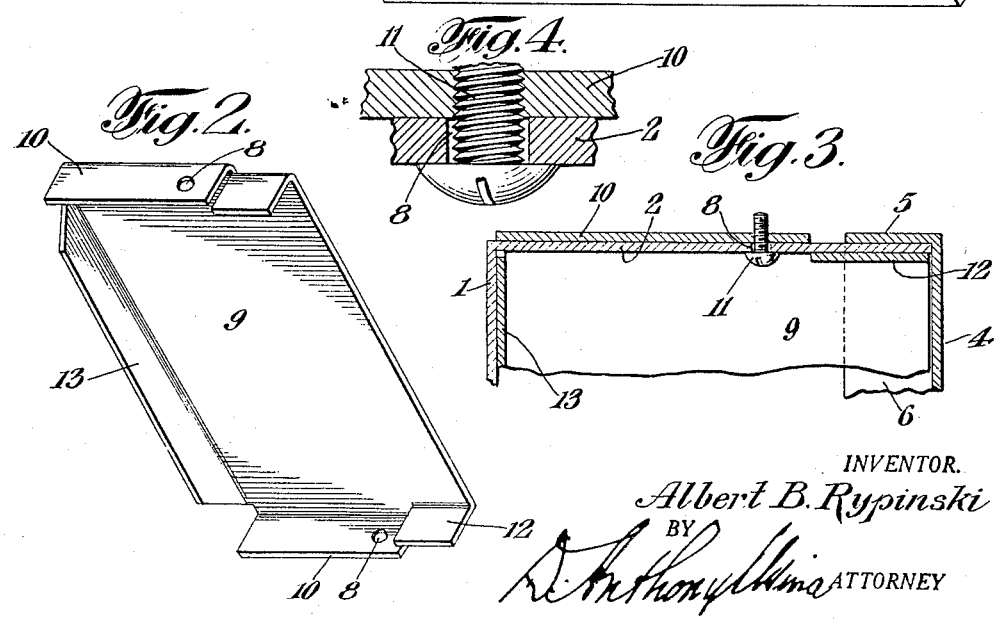
INVENTOR.
Albert B. Rypinski
BY
D. Anthony Ulina ATTORNEY

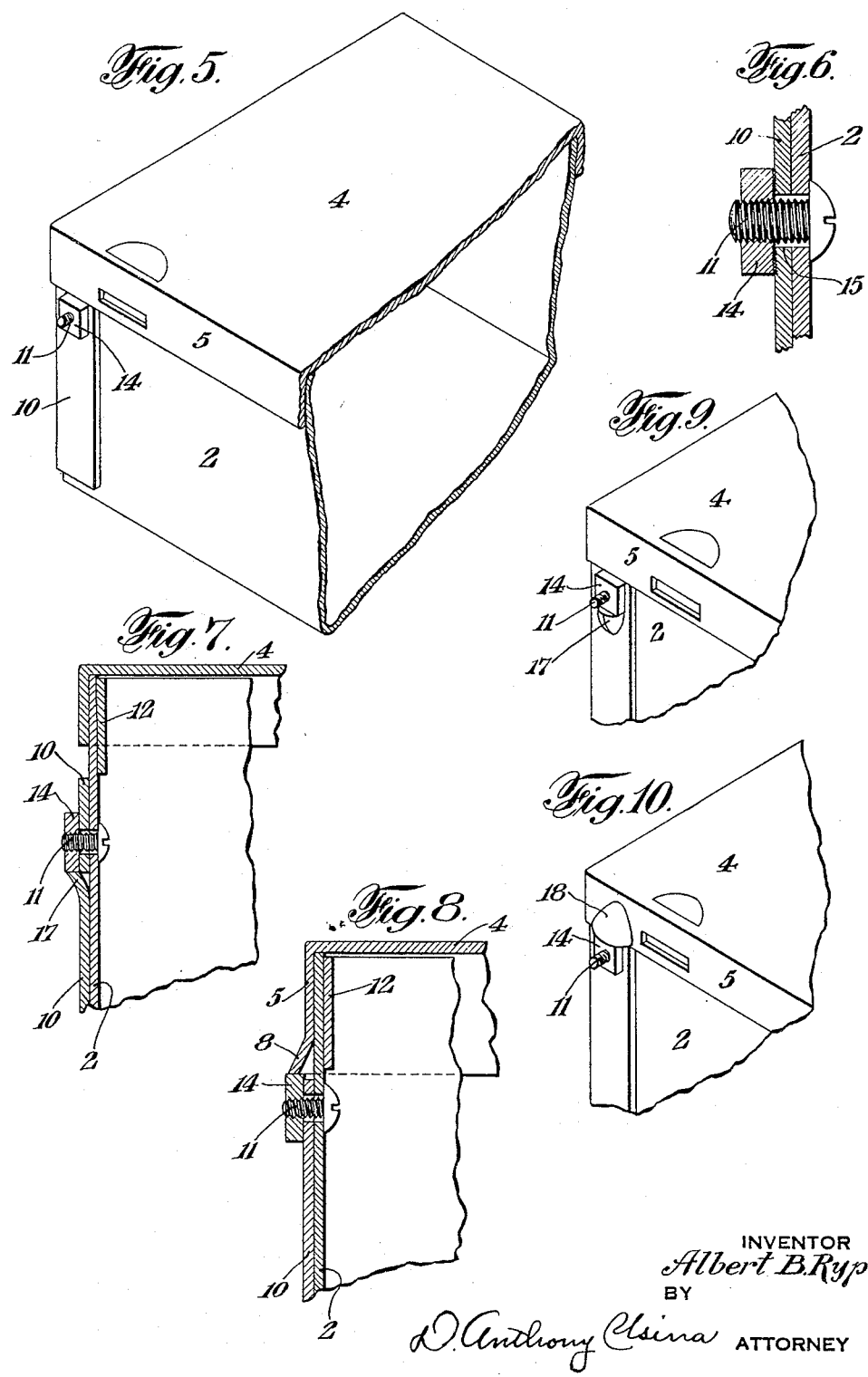

Patented Nov. 15, 1932

1,887,956

UNITED STATES PATENT OFFICE

ALBERT B. RYPINSKI, OF LAURELTON, NEW YORK, ASSIGNOR, BY MESNE ASSIGNMENTS, TO METROPOLITAN DEVICE CORPORATION, A CORPORATION OF NEW YORK

METER CONNECTION BOX

Application filed October 12, 1928. Serial No. 312,072.

The invention provides an improvement in meter boxes; that is, boxes which carry cutouts, fuses and similar appurtenances of a metered line and which boxes are mounted adjacent to the meter. Such boxes are provided with removable end walls, and the present improvement is directed particularly to such end walls and their connection to the box.

The accompanying drawings illustrate an embodiment of the invention.

Fig. 1 is a perspective view of a box with the end wall in place;

Fig. 2 is a similar view of the end wall separately;

Fig. 3 is a section on the line 3—3 of Fig. 1;

Fig. 4 is an enlarged detail.

Fig. 5 is a perspective view of a modification;

Fig. 6 is an enlarged detail thereof in section;

Figs. 7 and 8 are sections similar to Fig. 3 illustrating other modifications;

Figs. 9 and 10 are perspective views of the modifications shown in Figs. 7 and 8 respectively.

The box has a back wall 1, side walls 2 and lower end wall 3, to the edge of which is hinged a cover 4 having flanges 5 and 6 which fit over the edges of the box and over the end wall when the cover is down. Slots 7 and 8 serve for locking or sealing the cover closed. Such boxes are made in various designs. But because of the rules of the electric companies concerning interchangeability they all have the upper end provided with certain clearance holes 8 (Fig. 3) for screws.

Various designs of end wall, either closed or with openings to fit various meter casings, are made by different manufacturers for use with such boxes. The general practice is to snap or slide the end wall into place by the co-operation of certain grooves and ridges on the box and end wall and to secure it in place by two screws with their heads outside of the box, passing through the clearance holes and threaded into tapped holes in portions of the end wall lying within. This is open to the objection that the screws can be removed and the end wall pushed in or pulled out of the box enough to permit stealing the current even after the box cover is sealed or locked shut.

In Fig. 2 the end wall 9, either solid or apertured in any usual or suitable way, has flanges 10 at the sides which overlap the sides 2 of the box. The screws 11 are therefore installed with their heads inside of the box. The end wall has also flanges or ears 12 fitting within the side walls 2 at their upper edges where such side walls come within the flanges 5 of the cover. Preferably also a flange 13 is provided along the back edge of the end wall, fitting against the back of the box.

The flanges 10 and 12 at one side of the end wall embrace the side 2 of the box and prevent it from being forced either inward or outward. The edges of the side walls 2 are overlapped by the end wall so as to positively prevent its being pushed into the box or rotated around the screws (which prevents pulling the end wall out). It is important that the screw passes first through the clearance hole and then in the tapped hole. Its function is not merely to prevent lateral movement, but is chiefly useful to draw the two parts together and bond the separate end wall to the box with a good electrical connection, a usual requirement of the fire underwriters.

Instead of tapping the thread directly in the flanges 10 of the end wall, which are all fairly thin metal, they may be tapped in supplementary fastening devices applied to such flanges and held against rotation. See Figs. 5 to 8.

In the box of Fig. 5 the flanges 10 have nuts 14 applied to their outer faces to make threaded engagement with the screws 11 whose heads are within the box. The flange 10 may also be tapped so that the screw is threaded through it as well as through the nut. But for economy's sake, I propose to punch clearance holes 15 in the flanges, as shown in Fig. 6, and to weld the nuts to the flanges as indicated at 16 so that the nuts cannot be turned to release the screws.

In Fig. 7 the nuts are prevented from turning by bending out a portion of the flanges 10 to form bulges 17 engaging one of the faces of the nut and locking it.

In Fig. 8 the flanges 5 of the cover are brought further down and formed with bulging portions 18 which bear against faces of the nuts and prevent their turning.

The turning up of the screws, therefore, locks the nuts into close engagement with the flanges of the end wall with the same effect as if they were permanent parts thereof, as in the welded construction of Fig. 6. Or, conversely, the tapped portion of the flange 10 is the equivalent of a nut fastened to the flange.

Various modifications may be made by those skilled in the art without departing from the invention as defined in the following claims.

1. A meter box having an open end and having side walls with clearance holes for fastening screws near said open end, a cover for said box having flanges overlapping the edges of said side walls, a removable end wall having a flange overlying the inner face of the side walls, an outer flange overlying the outer face of said side wall adjacent the open end of said box beyond said cover flange and a rear flange overlying the front surface of the rear wall of said box adjacent said open end, said outer flange having threaded openings aligned with said clearance holes, and screws entering from the interior of said box through said clearance holes into said threaded openings.

2. A meter box having an open end, a cover for said box having flanges overlapping the edges of the side walls of said box, a removable end wall having a flange overlying the inner face of said side wall, an outer flange overlying the outer face of the side wall of said box adjacent the open end and below the edge of said cover flange, and a rear flange overlying the front face of the rear wall of said box adjacent said open end, said outer flange of said end wall and said side walls having aligned openings near said open end, screws entering said openings from the interior of said box, nuts on the exterior of said box threaded onto said screws, and means to prevent the turning of said nuts.

3. A meter box having an open end and having side walls, a cover for said box having flanges overlapping the edges of said side walls, a removable end wall having a flange overlying the inner face of said wall, an outer flange overlying the outer face of said side wall adjacent the open end of said box beyond said cover flange, a rear flange overlying the front surface of the rear wall of said box adjacent said open end, and means for securing the side walls of said box to said outer flange of said end wall.

In witness whereof, I have hereunto signed my name.

ALBERT B. RYPINSKI.